(12) United States Patent
Sasaki et al.

(10) Patent No.: US 7,044,865 B2
(45) Date of Patent: May 16, 2006

(54) GOLF BALL

(75) Inventors: Takashi Sasaki, Kobe (JP); Keiji Moriyama, Kobe (JP)

(73) Assignee: SRI Sports Limited, Kobe (JP)

( * ) Notice: Subject to any disclaimer, the term of this patent is extended or adjusted under 35 U.S.C. 154(b) by 32 days.

(21) Appl. No.: 10/768,027

(22) Filed: Feb. 2, 2004

(65) Prior Publication Data
US 2004/0176189 A1    Sep. 9, 2004

(30) Foreign Application Priority Data
Mar. 5, 2003    (JP) .............................. 2003-058642

(51) Int. Cl.
*A63B 37/12* (2006.01)

(52) U.S. Cl. .................................... 473/378

(58) Field of Classification Search ......... 473/378–385
See application file for complete search history.

(56) References Cited

U.S. PATENT DOCUMENTS

| | | |
|---|---|---|
| 4,813,677 A | 3/1989 | Oka et al. |
| 5,080,367 A | 1/1992 | Lynch et al. |
| 5,292,132 A | 3/1994 | Oka |
| 6,045,460 A * | 4/2000 | Hayashi et al. .............. 473/376 |
| 6,319,154 B1 * | 11/2001 | Yoshida et al. .............. 473/378 |
| 2002/0119838 A1 * | 8/2002 | Moriyama et al. .......... 473/378 |
| 2003/0050137 A1 * | 3/2003 | Moriyama .................. 473/383 |
| 2003/0073514 A1 | 4/2003 | Iwami et al. |
| 2003/0109334 A1 * | 6/2003 | Moriyama et al. .......... 473/383 |
| 2003/0134696 A1 * | 7/2003 | Moriyama et al. .......... 473/378 |

* cited by examiner

*Primary Examiner*—Raeann Gorden
(74) *Attorney, Agent, or Firm*—Birch, Stewart, Kolasch & Birch, LLP

(57) ABSTRACT

Golf ball 1 has a core 2 and a cover 3. The core 2 is composed of a center 4 and a mid layer 5. Numerous dimples 6 are formed on the surface of the cover 3. Base polymer of this cover 3 includes a thermoplastic polyurethane elastomer as a principal component. Shore D hardness of this cover 3 is 30 or greater and 55 or less. Surface area occupation ratio Y of these dimples 6 is equal to or greater than 0.80. Total volume V of these dimples 6 is 300 mm$^3$ or greater and 700 mm$^3$ or less. Average volume Va that is a value derived through dividing this total volume V by total number of the dimples is equal to or greater than 1.30 mm$^3$. Average curvature R that is a mean value of the curvature r of the cross-sectional shape of these dimples 6 is equal to or greater than 16 mm. Average occupation ratio y that is a value derived through dividing the surface area occupation ratio Y by total number N of the dimples is equal to or greater than 0.0022.

11 Claims, 14 Drawing Sheets

GOLF BALL

This nonprovisional application claims priority under 35 U.S.C. § 119(a) on Patent Application No(s). 2003-058642 filed in JAPAN on Mar. 5, 2003, which is(are) herein incorporated by reference.

BACKGROUND OF THE INVENTION

1. Field of the Invention

The present invention relates to golf balls. More particularly, the present invention relates to golf balls having a core and a cover, with dimples being formed on the cover.

2. Description of the Related Art

General golf balls that are commercially available in the market have a core and a cover. There exist cores composed of a single solid rubber layer, those composed of two or more solid rubber layers, and those composed of a synthetic resin layer in addition to a solid rubber layer, and the like.

There are numerous dimples formed on the surface the cover. A role of the dimples involves causing turbulent flow separation through disrupting the air flow around the golf ball during the flight (hereinafter, referred to as "dimple effect"). By causing the turbulent flow separation, a separating point of air from the golf ball shifts backwards leading to the reduction of a drag coefficient (Cd). The turbulent flow separation promotes the differentia between upper and lower separating points of the golf ball that result from the backspin, thereby enhancing the lift force that acts upon the golf ball. Flight distance of the golf ball is prolonged on behalf of the reduced drag and enhanced lift force. Aerodynamically excellent dimples promote the turbulent flow separation. In other words, aerodynamically excellent dimples may render the air flow better.

What is most demanded for a golf ball by golf players is travel distance. Golf players place particular importance on the travel distance upon hit with a driver. Specifications of dimples that may exert a great influence on flight performance of a golf ball include total volume. Golf balls having too small total dimple volume tend to provide a hopping trajectory, whilst golf balls having too large total dimple volume tend to provide a dropping trajectory. In either case, sufficient flight distance is not achieved. In order to achieve a proper trajectory and a great flight distance, total volume of the dimples must be defined within a predetermined range.

Various proposals have been made in connection with density of dimples. JP-B No. 58-50744 discloses a golf ball having densely arranged dimples such that a pitch between the dimples is as 1.62 mm or less as possible. JP-A No. 62-192181 discloses a golf ball having densely arranged dimples such that any new dimple having greater area than the average area can not be formed. JP-A No. 4-347177 discloses a golf ball having extremely densely arranged dimples, with lands, on which a rectangle having a predetermined size can be drawn, existing by equal to or less than 40. Any one of the golf balls disclosed in these known documents has densely arranged dimples, in other words, it has increased surface area occupation ratio of dimples. Persons skilled in the art acknowledge that surface area occupation ratio is an important factor that exerts an influence on the dimple effect in addition to total volume of dimples.

Performances of golf balls on which great importance is attached similarly to flight distance include a spin performance. High backspin speed results in small run (a distance from the position where the golf ball dropped to a position where it stopped, also referred to as "roll"). In other words, for golf players, golf balls which are liable to be spun backwards are apt to be stopped readily at a targeted position. High side spin speed results in possibility of curving of the golf ball. In other words, for golf players, golf balls which are liable to be side spun are apt to be intentionally curved. Golf balls that are excellent in spin performances are excellent in control performances. High-class golf players particularly place great importance on control performances upon impact with a short iron.

In general golf balls, an ionomer resin has been used in the cover. Ionomer resins are excellent in durability and the resilience performances. However, ionomer resins have high hardness, in general. Golf balls having a cover composed of an ionomer resin are inferior in control performances. In an attempt to improve the control performances, a cover in which a hard ionomer resin and a ternary copolymer-based soft ionomer resin are used in combination has been proposed. Furthermore, a cover in which an ionomer resin and a thermoplastic elastomer are used in combination has been.also proposed. In addition, a cover composed of a thermosetting polyurethane has been also proposed.

JP-A No. 2002-360740 discloses a golf ball having a cover including a thermoplastic polyurethane elastomer as a principal component. This cover is soft. This golf ball is extremely excellent in control performance.

A golf ball having a cover including a thermoplastic polyurethane elastomer as a principal component is liable to be spun backwards. When this golf ball is hit by a driver, lift force at an initial stage of the trajectory tends to be too large. Horizontal intensity of the lift force at the initial stage of the trajectory is in a reverse direction to the direction of flight. Excessive backspin impairs the flight distance of the golf ball.

Accordingly, travel performances and control performances are conflicting performances. A golf ball that is satisfactory enough to golf players has not yet obtained. The present invention was made taking into account of such circumstances, and an object of the invention is to provide golf balls which are excellent in both terms of a flight performance and a control performance.

SUMMARY OF THE INVENTION

The golf ball according to the present invention has a core, a cover and numerous dimples formed on the surface of this cover. Base polymer of this cover includes a thermoplastic polyurethane elastomer as a principal component. Shore D hardness of this cover is 30 or greater and 55 or less. Surface area occupation ratio Y of these dimples is 0.80 or greater and 0.90 or less. Total volume V of these dimples is 300 mm$^3$ or greater and 700 mm$^3$ or less. Average volume Va that is a value derived through dividing this total volume V by total number of the dimples is equal to or greater than 1.30 mm$^3$.

Because base polymer of this cover includes a thermoplastic polyurethane elastomer as a principal component, and Shore D hardness of the cover is 30 or greater and 55 or less, this golf ball is excellent in a control performance. This golf ball is also excellent in a flight performance. Although grounds for the excellent flight performance of this golf ball are not certain in detail, it is speculated that a dimple pattern having the average volume Va of equal to or greater than 1.30 mm$^3$ is responsible for suppressing the lift force at the initial stage of the trajectory upon impact with a driver. According to the present invention, the flight performance, which may be inferior due to the thermoplastic polyurethane elastomer that is used in an attempt to improve the control performance, is compensated by the dimples. This golf ball is excellent in both terms of a flight performance and a control performance.

Preferably, average curvature R that is a mean value of the curvature r of the cross-sectional shape of the dimples is equal to or greater than 16 mm. This golf ball is extremely excellent in a flight performance.

Preferably, average occupation ratio y that is a value derived through dividing the surface area occupation ratio Y by total number N of the dimples is equal to or greater than 0.0022. According to this golf ball, ratio of dimples having a great area is large. Dimples having a great area are responsible for the flight performance of the golf ball.

Preferably, a summation X of the contour length x of the dimples and the surface area occupation ratio Y satisfy the relationship represented by the following formula (I).

$$X \leq 3882*Y+1495 \tag{I}$$

This golf ball is provided with a dimple pattern in which total contour length X is relatively small contrary to the surface area occupation ratio Y. This golf ball is extremely excellent in a flight performance.

Preferably, number of dimples having the contour length x of equal to or greater than 10.5 mm accounts for equal to or greater than 91% of total number of the dimples. Dimples having a great contour length x are responsible for the flight performance of the golf ball.

Preferably, the base polymer of the cover includes a thermoplastic polyamide elastomer. According to a dimple pattern having the average volume Va of equal to or greater than 1.30 mm$^3$, scuff resistance tends to be insufficient due to a large number of scattering lands having a small width. A thermoplastic polyamide elastomer is responsible for the scuff resistance.

DESCRIPTION OF THE PREFERRED EMBODIMENTS

The present invention is hereinafter described in detail with appropriate references to the accompanying drawing according to the preferred embodiments of the present invention.

Figure 1:
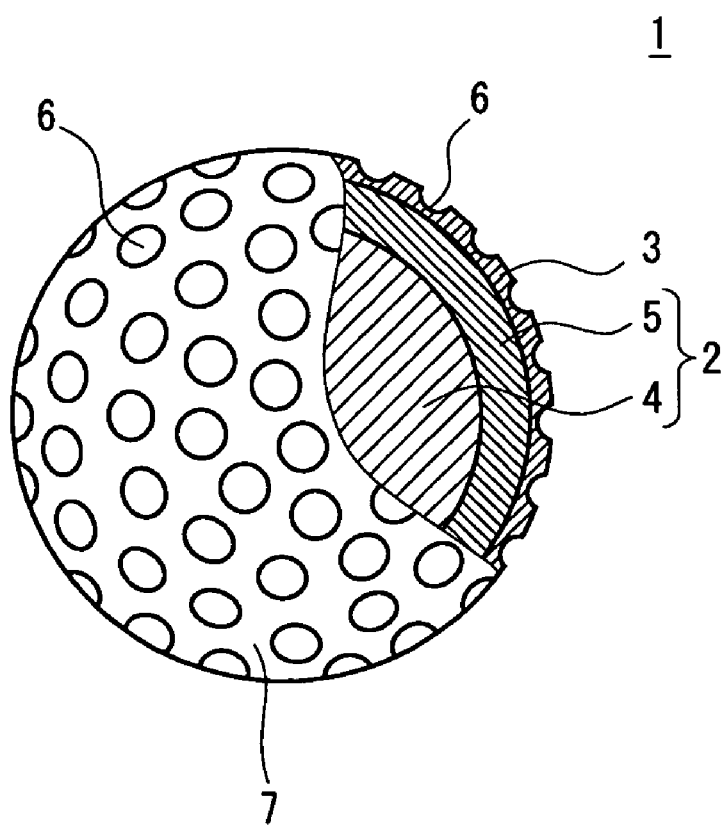
FIG. 1 is a schematic cross-sectional view illustrating a golf ball according to one embodiment of the present invention.

A golf ball 1 depicted in FIG. 1 has a spherical core 2 and a cover 3. The core 2 is composed of a spherical center 4 and a mid layer 5. Numerous dimples 6 are formed on the surface of the cover 3. Of the surface of the cover 3, parts other than the dimples 6 are lands 7. This golf ball 1 has a paint layer and a mark layer to the external side of the cover 3, although there layers are not shown in the Figure. This golf ball 1 has a diameter of from 40 mm to 45 mm in general, and in particular, of from 42 mm to 44 mm. In light of the reduction of the air resistance in the range to comply with a rule defined by United States Golf Association (USGA), the diameter is preferably 42.67 mm or greater and 42.85 mm or less. Weight of this golf ball 1 is generally 40 g or greater and 50 g or less, and particularly 44 g or greater and 47 g or less. In light of the elevation of inertia in the range to comply with a rule defined by USGA, the weight is particularly preferably 45.00 g or greater and 45.93 g or less.

The cover 3 herein means an outermost layer except for the paint layer and the mark layer. There exist golf balls referred to as having a two-layered cover, and in this instance, the outer layer corresponds to the cover 3 herein.

Base polymer of the cover 3 includes a thermoplastic polyurethane elastomer as a principal component. General thermoplastic polyurethane elastomers include a polyurethane component as a hard segment, and a polyester component or a polyether component as a soft segment. The thermoplastic polyurethane elastomer is so soft that it improves a spin performance of the golf ball 1. This golf ball 1 is excellent in a control performance.

Illustrative examples of the curing agent for the polyurethane component include alicyclic diisocyanates, aromatic diisocyanates and aliphatic diisocyanates. Particularly, alicyclic diisocyanates are preferred. Because an alicyclic diisocyanate has no double bond in its main chain, yellowing of the cover 3 may be suppressed. In addition, because an alicyclic diisocyanate is excellent in strength, scuffs of the cover 3 may be suppressed. Two or more kinds of diisocyanates may be used in combination.

Illustrative examples of the alicyclic diisocyanate include 4,4'-dicyclohexylmethanediisocyanate ($H_{12}$MDI) which is a hydrogenated product of 4,4'-diphenylmethane diisocyanate, 1,3-bis (isocyanatomethyl)cyclohexane ($H_6$XDI) which is a hydrogenated product of xylylene diisocyanate, isophorone diisocyanate (IPDI) and trans-1,4-cyclohexane diisocyanate (CHDI). In light of general-purpose properties and processing characteristics, $H_{12}$MDI is preferred. Specific examples of the thermoplastic polyurethane elastomer including $H_{12}$MDI as a constituent component include trade name "Elastolan XNY90A", trade name "Elastolan XNY97A" and trade name "Elastolan XNY585" of BASF Polyurethane Elastomers Ltd.

Illustrative examples of the aromatic diisocyanate include 4,4'-diphenylmethane diisocyanate (MDI) and toluene diisocyanate (TDI). Illustrative examples of the aliphatic diisocyanate include hexamethylene diisocyanate (HDI).

In the base polymer of the cover 3, other synthetic resin may be used together with the thermoplastic polyurethane elastomer. When other synthetic resin is used with the thermoplastic polyurethane elastomer in combination, the thermoplastic polyurethane elastomer is included as a principal component, in light of the control performance. Proportion of the thermoplastic polyurethane elastomer occupied in total base polymer is preferably equal to or greater than 50% by weight, more preferably equal to or greater than 70% by weight, and particularly preferably equal to or greater than 80% by weight.

Illustrative examples of the synthetic resin which may be used include thermoplastic polyamide elastomers, thermoplastic polyester elastomers, thermoplastic polyolefin elastomers and ionomer resins. In particular, thermoplastic polyamide elastomers are preferred. A thermoplastic polyamide elastomer is excellent in compatibility with a thermoplastic polyurethane elastomer. A thermoplastic polyamide elastomer is responsible for the resilience performance of the golf ball 1. When a thermoplastic polyurethane elastomer and a thermoplastic polyamide elastomer are used in combination, weight ratio of both components is preferably 70/30 or greater and 95/5 or less.

The thermoplastic polyamide elastomer is responsible also for the scuff resistance of the cover 3. In a golf ball 1 having the surface area occupation ratio Y of equal to or greater than 0.80, the area of the lands 7 is so small that great pressure is placed on the land 7 upon impact with a golf club. According to this golf ball 1, the lands 7 are liable to be scuffed. Particularly, according to the golf ball 1 having the average volume Va of equal to or greater than 1.30 mm$^3$, occurring of scuffs may be facilitated due to a large number of scattering lands 7 having a small width, which are present on the surface. Through the use of a thermoplastic polyamide elastomer, occurrence of scuffs may be suppressed.

General thermoplastic polyamide elastomers include a polyamide component as a hard segment, and a polyester component or a polyether component as a soft segment. Suitable soft segment is a polyether component. Specific examples of suitable thermoplastic polyamide elastomer include trade name "Pevax 5533" and "Pevax 4033" of ATOFINA Japan Co., Ltd.

In the cover 3 may be blended an appropriate amount of various additives as needed. Specific examples of the additive include coloring agents such as titanium dioxide, fillers such as barium sulfate, dispersants, antioxidants, ultraviolet absorbents, light stabilizers, fluorescent agents, fluorescent brightening agents and the like. For the purpose of adjusting the specific gravity, the cover 3 may be blended with powder of a highly dense metal. Specific examples of the highly dense metal include tungsten and molybdenum.

Shore D hardness Hc of the cover 3 is 30 or greater and 55 or less. In other words, the cover 3 has a soft nature. By employing a soft cover 3, a contact time period and a contact area of the golf ball 1 with the club face upon impact with a golf club are increased. A spin performance of the golf ball 1 is thereby improved, leading to the improvement of a control performance. In this respect, hardness Hc of the cover 3 is more preferably equal to or less than 50. When the hardness Hc of the cover 3 is too low, the resilience performance of the golf ball 1 becomes insufficient. Therefore, the hardness Hc is more preferably equal to or greater than 35, and particularly preferably equal to or greater than 40.

Thickness of the cover 3 is preferably 0.2 mm or greater and 2.0 mm or less. When the thickness is less than the above range, the control performance and durability of the golf ball 1 may become insufficient. In this respect, the thickness is more preferably equal to or greater than 0.3 mm, and particularly preferably equal to or greater than 0.5 mm. When the thickness is beyond the above range, the resilience performance and the flight performance of the golf ball 1 may become insufficient. In this respect, the thickness is more preferably equal to or less than 1.8 mm, and particularly preferably equal to or less than 1.5 mm.

Figure 2:
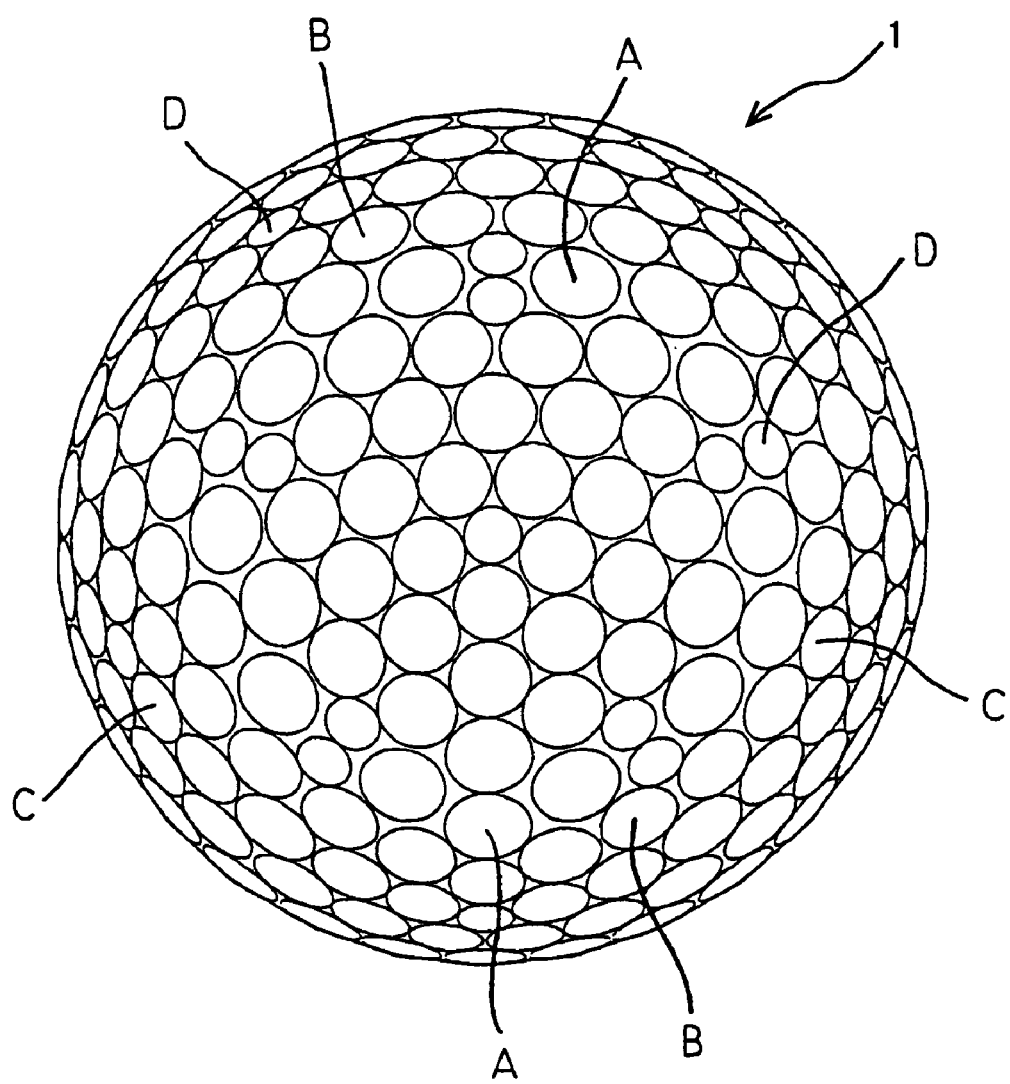
FIG. 2 is an enlarged plan view illustrating the golf ball shown in FIG. 1.
Figure 3:
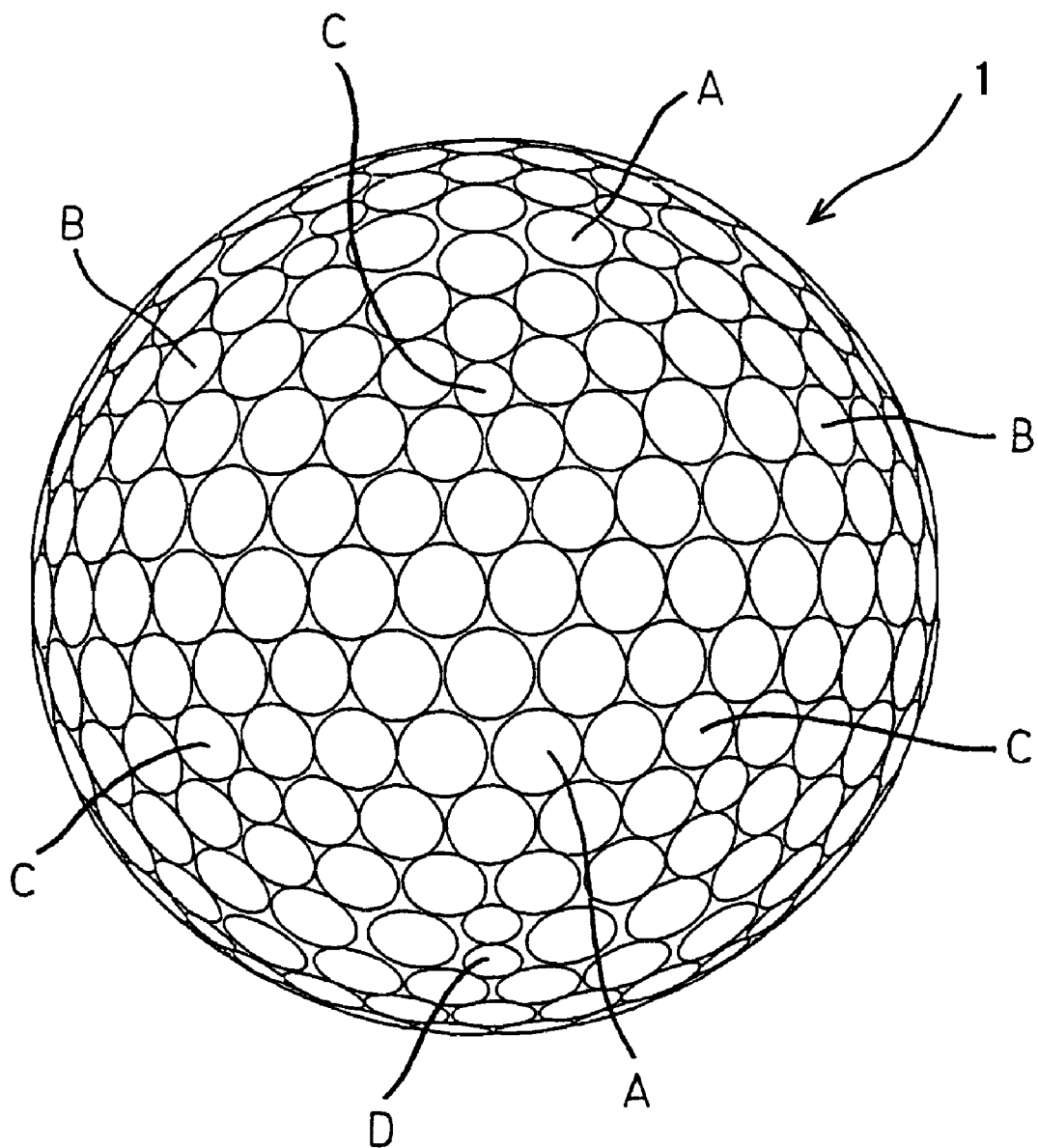
FIG. 3 is a front view illustrating the golf ball shown in FIG. 2.

FIG. 2 is an enlarged plan view illustrating the golf ball 1 shown in FIG. 1, and FIG. 3 is a front view of the same. This golf ball 1 has A dimples having a plane shape of circular with the diameter of 4.5 mm, B dimples having a plane shape of circular with the diameter of 4.1 mm, C dimples having a plane shape of circular with the diameter of 3.5 mm, and D dimples having a plane shape of circular with the diameter of 2.7 mm. The term "plane shape" referred to herein means the shape of the contour line that is a boundary between a phantom spherical face and a dimple when it is viewed at infinity. Number of the A dimple is 130; number of the B dimple is 150; number of the C dimple is 60; and number of the D dimple is 32. Total number of dimples of this golf ball 1 is 372.

Figure 4:
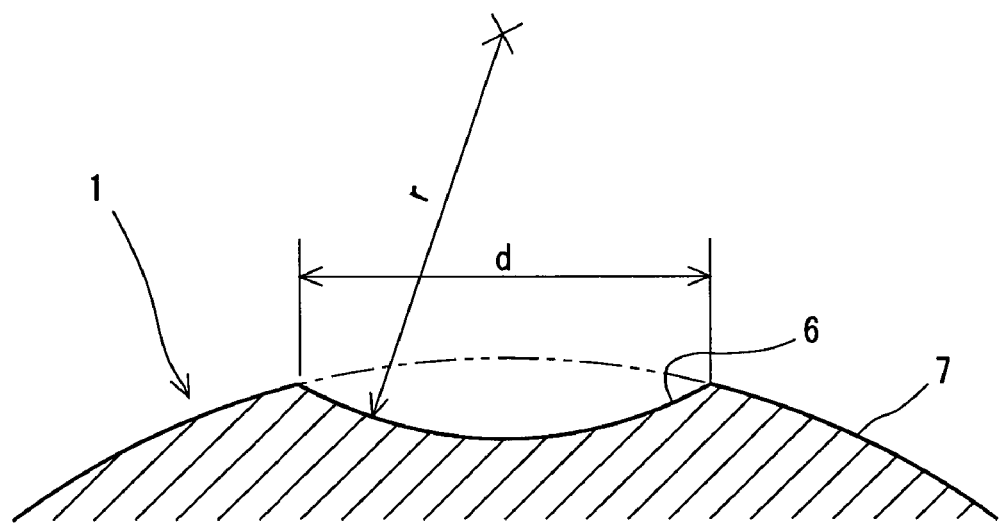
FIG. 4 is a schematic enlarged cross-sectional view illustrating a part of the golf ball shown in FIG. 1.

FIG. 4 is a schematic enlarged cross-sectional view illustrating a part of the golf ball 1 shown in FIG. 1. In this Figure, a cross-section viewed along a plane that passes the center of gravity of plane shape of the dimple and the center of the golf ball 1. As is clear from this Figure, cross-sectional shape of the dimple is almost a circular arc. In other words, the surface of the dimple forms a part of the spherical face. In FIG. 4, a phantom sphere (a sphere when it was postulated that there is no dimple existed) is depicted by a chain double-dashed line.

"Total volume V" herein means a summation of the volume v of all the dimples. The "volume v of the dimple" herein means the volume of a space surrounded by a phantom spherical surface (shown by a chain double-dashed line in FIG. 4) and the surface of the dimple. A value (V/N) derived by dividing the total volume V by total number N of the dimples is the average volume Va. In the golf ball 1 shown in FIG. 2 and FIG. 3, the volume v of the A dimple is 1.788 mm$^3$; the volume v of the B dimple is 1.351 mm$^3$; the volume v of the C dimple is 0.855 mm$^3$; and the volume v of the D dimple is 0.426 mm$^3$ Therefore, total volume V of this golf ball 1 is 500.0 mm$^3$, and the average volume Va is 1.344 mm$^3$.

What is shown by the arrow r in FIG. 4 is the curvature of a circular arc that forms the cross-sectional shape. In instances of a dimple having the cross-sectional shape not describing a circular arc or having the plane shape not being circular, the curvature r varies depending on the site where the measurement is executed. In case of such a dimple, a circular dimple, which has a cross-sectional shape describing a circular arc, is envisioned of which area of the plane shape is the same as that of the subject dimple and of which volume v is the same as that of the subject dimple. Then, the curvature r of the subject dimple is derived by calculation on the basis of the cross-sectional shape of thus envisioned circular dimple.

The term "average curvature R" used herein means a mean value of the curvature r of all the dimples. For example, in case of the golf ball 1 having n1 dimples that have the curvature of r1, n2 dimples that have the curvature of r2, and n3 dimples that have the curvature of r3, wherein n1, n2 and n3 represent number of each dimple, the average curvature R is derived by calculation according to the following formula:

$$R=(r1*n1+r2*n2+r3*n3)/(n1+n2+n3)$$

In the golf ball 1 shown in FIG. 2 and FIG. 3, the curvature r of the A dimple is 23.98 mm; the curvature r of the B dimple is 19.91 mm; the curvature r of the C dimple is 14.53 mm; and the curvature r of the D dimple is 8.67 mm. Therefore, the average curvature R of this golf ball 1 is 19.5 mm.

What is shown by a both-sided arrowhead d in FIG. 4 is the diameter of the dimple. This diameter d is a distance between both contact points when common tangent lines are depicted at both sides of the dimple. Such contact points form a contour line by serial connections.

The term "surface area occupation ratio Y" herein means a value obtained by dividing a summation of the area of all the dimples by the surface are of the phantom sphere. The "area of dimple" herein means the area of a plan shape of the dimple. In the case of a circular dimple, the area s is derived by calculation according to the following formula.

$$s=(d/2)^2 * \pi$$

In the golf ball 1 shown in FIG. 2 and FIG. 3, the area s of the A dimple of is 15.9 mm$^2$; the area s of the B dimple is 13.2 mm$^2$; the area s of the C dimple is 9.6 mm$^2$; and the area s of the D dimple is 5.7 mm$^2$. Therefore, the summation S of the area of the dimples is 4805.4 mm$^2$. The surface area occupation ratio Y is derived through dividing this summation S by the surface are of the phantom sphere. This golf ball has the surface area occupation ratio Y of 0.840. The average occupation ratio y is derived through dividing this surface area occupation ratio Y by total number N of the dimples. This golf ball 1 has the average occupation ratio y of 0.00226.

The term "total contour length X" referred to herein means a summation of the contour length x of all the dimples. The "contour length x" herein refers to the length which is obtained by the actual measurement along the contour line of the dimple. For example, in the instance of a dimple having a triangular plane shape, a summation of length of the three edges corresponds to the contour length x. Because this edge exists on a spherical face, it has an arcuate shape in its strict sense. The length of this arc is assumed as the length of the edge. In the case of a circular dimple, the contour length x is derived by calculation according to the following formula.

$$x = d * \pi$$

In the golf ball 1 shown in FIG. 2 and FIG. 3, the contour length x of the A dimple of is 14.1 mm; the contour length x of the B dimple is 12.9 mm; the contour length x of the C dimple is 11.0 mm; and the contour length x of the D dimple is 8.5 mm. Therefore, this golf ball 1 has the total contour length X of 4701.1 mm.

According to the present invention, the surface area occupation ratio Y is set to be 0.80 or greater and 0.90 or less. When the surface area occupation ratio Y is less than the above range, lift force of the golf ball 1 during the flight may be deficient. In this respect, the surface area occupation ratio Y is more preferably equal to or greater than 0.81, and particularly preferably equal to or greater than 0.83. When the surface area occupation ratio Y is beyond the above range, a trajectory of the golf ball 1 may become too high. In this respect, the surface area occupation ratio Y is particularly preferably equal to or less than 0.87.

According to the present invention, total volume V is set to be preferably 300 mm$^3$ or greater and 700 mm$^3$ or less. When the total volume V is less than the above range, a hopping trajectory may be provided. In this respect, the total volume V is more preferably equal to or greater than 400 mm$^3$, and particularly preferably equal to or greater than 460 mm$^3$. When the total volume V is beyond the above range, a dropping trajectory may be provided. In this respect, the total volume V is more preferably equal to or less than 600 mm$^3$, and particularly preferably equal to or less than 540 mm$^3$.

In an attempt to design a golf ball having a dimple pattern with a predetermined total volume V and with a large surface area occupation ratio Y by a designer, there exists a means to achieve such a surface area occupation ratio Y by increasing the number of dimples. Alternatively, there also exists a means to achieve such a surface area occupation ratio Y by increasing the size of the dimples 6. The golf ball 1 of the present invention has the average volume Va of equal to or greater than 1.30 mm$^3$. In other words, according to the golf ball 1 of the present invention, a predetermined surface area occupation ratio Y is achieved by setting the size of the dimples 6 to be large. Dimples having a large size are speculated to be responsible for suppressing the lift force at the initial stage of the trajectory (i.e., the stage of a flight at a high speed).

In light of the flight performance, the average volume Va is more preferably equal to or greater than 1.35 mm$^3$, and particularly preferably equal to or greater than 1.50 mm$^3$. Because too large average volume Va results in lack of smoothness of the surface of the golf ball 1, the average volume Va is more preferably equal to or less than 3.00 mm$^3$, and particularly preferably equal to or less than 2.50 mm$^3$.

The volume v of individual dimples is generally 0.2 mm$^3$ or greater and 4.5 mm$^3$ or less. Percentage of the number of dimples, which have the volume v of equal to or greater than 1.35 mm$^3$, occupied in total number N preferably accounts for equal to or greater than 20%, and particularly preferably equal to or greater than 30%.

In light of the flight performance, the average curvature R is preferably equal to or greater than 16 mm, more preferably equal to or greater than 18 mm, and particularly preferably equal to or greater than 20 mm. Because too large average curvature R results in lack of smoothness of the surface of the golf ball 1, the average curvature R is more preferably equal to or less than 30 mm, and particularly preferably equal to or less than 25 mm.

The curvature r of individual dimples is usually 5 mm or greater and 50 mm or less. Percentage of the number of dimples, which have the curvature r of equal to or greater than 16 mm, occupied in total number N preferably accounts for equal to or greater than 60%, more preferably equal to or greater than 70%, and particularly preferably equal to or greater than 80%. This percentage is ideally 100%.

The average occupation ratio y is preferably equal to or greater than 0.0022. When the average occupation ratio y is less than the above range, lift force of the golf ball 1 at the initial stage of the trajectory becomes excessive, which may result in insufficient flight distance of the golf ball 1. In this respect, the average occupation ratio y is more preferably equal to or greater than 0.00225, still more preferably equal to or greater than 0.00230, and particularly preferably equal to or greater than 0.00250. Too great average occupation ratio y results in lack of smoothness of the golf ball 1. Therefore, the average occupation ratio y is preferably equal to or less than 0.00400

It is preferred that the surface area occupation ratio Y and the total contour length X satisfy the relationship represented by the following formula (I).

$$X \leq 3882*Y+1495 \quad (I)$$

According to this golf ball 1, total contour length X is relatively small contrary to the surface area occupation ratio Y. This golf ball 1 has small drag coefficient (Cd) during the flight. This golf ball 1 exhibits excellent flight performance. As long as the present inventor is aware, any large size golf ball which satisfies the above formula (I) has not been present so far.

In light of the reduction of the drag coefficient (Cd), it is more preferred that the total contour length X and the surface area occupation ratio Y satisfy the following formula (II); it is even more preferred that both satisfy the following formula (III); and it is particularly preferred that both satisfy the following formula (IV).

$$X \leq 3882*Y+1445 \quad (II)$$

$$X \leq 3882*Y+1335 \quad (III)$$

$$X \leq 3882*Y+1085 \quad (IV)$$

In order to sustain the fundamental feature of a golf ball which is a substantially spherical body, total contour length X and the surface area occupation ratio Y are required to satisfy the relationship represented by the following formula (V).

$$X \geq 3882*Y+95 \quad (V)$$

Although total contour length X is determined ad libitum on the basis of the relationship with the surface area occupation ratio Y in the range to satisfy the above formula (I), it is usually set to be 2800 mm or greater and 5000 mm or less, and particularly, 3100 mm or greater and 4700 mm or less.

In light of the reduction of the drag coefficient (Cd), number of the dimples having the contour length x of equal to or greater than 10.5 mm accounts for preferably equal to or greater than 91%, and particularly preferably equal to or greater than 95% of total number of the dimples. This percentage is ideally 100%.

Although size of the individual dimples is not particularly limited, when a circular dimple is formed, the diameter d thereof is generally set to be 2.0 mm or greater and 8.0 mm or less, and particularly 3.0 mm or greater and 7.0 mm or less. The dimples formed may be of only one type, alternatively, plural types of dimples may be also formed. In stead of the circular dimples, or together with the circular dimples, non-circular dimples (dimples of which plane shape is not circular) may be also formed. When a non-circular dimples is formed, the contour length x thereof is usually set to be 6 mm or greater and 25 mm or less, and particularly 9 mm or greater and 22 mm or less. In light of easy production of the mold for the golfball, it is preferred that only circular dimples are formed, without any non-circular dimple formed. In particular, circular dimples that have the cross-sectional shape describing a circular arc are preferred.

Total number of the dimples is preferably 200 or greater and 500 or less. When the total number is less than the above range, there is a possibility that the fundamental feature of the golf ball which is a substantially spherical body may not be sustained. In this respect, total number is particularly preferably equal to or more than 250. When the total number is beyond the above range, a drag coefficient (Cd) may become so large that the flight distance may become insufficient. In this respect, total number is particularly preferably equal to or less than 400.

Specifications of the dimple such as the diameter d, curvature r, volume v and the like can be determined by actual measurement of the golf ball 1. The golf ball 1 generally has a paint layer on its surface, and thus accurate measurement of the size may involve difficulties owing to the influences of this paint layer. According to the present invention, as a matter of convenience, the golf ball prior to the painting may be subjected to the actual measurement.

In general, the center 4 is obtained through crosslinking of a rubber composition. Illustrative examples of a base rubber for use in the rubber composition include polybutadienes, polyisoprenes, styrene-butadiene copolymers, ethylene-propylene-diene copolymers and natural rubbers. Two or more kinds of these rubbers may be used in combination. In view of the resilience performance, polybutadienes are preferred. In the case where another rubber is used in combination with a polybutadiene, to employ a polybutadiene as a predominant component is preferred. Specifically, it is preferred that a proportion of polybutadiene occupied in total base rubber be equal to or greater than 50% by weight, and particularly equal to or greater than 80% by weight. Polybutadienes having a percentage of cis-1, 4 bond of equal to or greater than 40%, and particularly equal to or greater than 80% are particularly preferred.

For crosslinking of the center 4, a co-crosslinking agent is usually used. Preferable co-crosslinking agent in view of the resilience performance is a monovalent or bivalent metal salt of an $\alpha$, $\beta$-unsaturated carboxylic acid having 2 to 8 carbon atoms. Specific examples of the preferable co-crosslinking agent include zinc acrylate, magnesium acrylate, zinc methacrylate and magnesium methacrylate. Zinc acrylate and zinc methacrylate are particularly preferred on the grounds that a high resilience performance can be achieved.

As a co-crosslinking agent, an $\alpha$, $\beta$-unsaturated carboxylic acid having 2 to 8 carbon atoms, and a metal oxide may be blended. Both components react in the rubber composition to give a salt. This salt serves as a co-crosslinking agent. Examples of the preferable $\alpha$, $\beta$-unsaturated carboxylic acid include acrylic acid and methacrylic acid. Examples of the preferable metal oxide include zinc oxide and magnesium oxide.

The amount of the co-crosslinking agent to be blended is preferably 10 parts by weight or greater and 50 parts by weight or less per 100 parts by weight of the base rubber. When the amount to be blended is less than the above range, the resilience performance of the golf ball 1 may become insufficient. In this respect, the amount to be blended is more preferably equal to or greater than 15 parts by weight. When the amount to be blended is beyond the above range, the feel at impact of the golf ball 1 may become hard. In this respect, the amount to be blended is more preferably equal to or less than 45 parts by weight.

In the rubber composition for use in the center 4, an organic peroxide may be preferably blended together with the co-crosslinking agent. The organic peroxide is responsible for a crosslinking reaction. By blending the organic peroxide, the resilience performance of the golf ball 1 may be improved. Examples of suitable organic peroxide include dicumyl peroxide, 1,1-bis(t-butylperoxy)-3,3,5-trimethylcyclohexane, 2,5-dimethyl-2,5-di(t-butylperoxy)hexane and di-t-butyl peroxide. Particularly versatile organic peroxide is dicumyl peroxide.

The amount of the organic peroxide to be blended is preferably 0.1 part by weight or greater and 3.0 parts by weight or less per 100 parts by weight of the base rubber. When the amount to be blended is less than the above range, the resilience performance of the golf ball 1 may become insufficient. In this respect, the amount to be blended is more preferably equal to or greater than 0.3 part by weight, and particularly preferably equal to or greater than 0.5 part by weight. When the amount to be blended is beyond the above range, the feel at impact of the golf ball 1 may become hard. In this respect, the amount to be blended is particularly preferably equal to or less than 2.5 parts by weight.

The center 4 may be blended with a filler for the purpose of adjusting specific gravity and the like. Examples of suitable filler include zinc oxide, barium sulfate, calcium carbonate and magnesium carbonate. Powder of highly dense metal may be blended as a filler. Specific examples of the highly dense metal include tungsten and molybdenum. The amount of the filler to be blended is determined ad libitum so that the intended specific gravity of the center 4 can be accomplished. Particularly preferable filler is zinc oxide. Zincoxide serves not only as a mere agent for adjusting specific gravity but also as a crosslinking activator. Various kinds of additives such as sulfur, an anti-aging agent, a coloring agent, a plasticizer, a dispersant and the like may be blended at an appropriate amount to the center 4 as needed. The center 4 may be further blended with crosslinked rubber powder or synthetic resin powder.

The diameter of a general center 4 is set to be 25 mm or greater and 41 mm or less, and particularly 27 mm or greater and 40 mm or less. Crosslinking temperature of the center 4 is in general, from 140° C. or greater and 180° C. or less. The crosslinking time period of the center 4 is in general, 10 minutes or longer and 60 minutes or less.

The mid layer 5 may be composed of a crosslinked rubber, or may be composed of a resin composition. When it is composed of a crosslinked rubber, the base rubber thereof may be similar to the base rubber for the center 4 as described above. Furthermore, a similar co-crosslinking agent and organic peroxide to those which may be blended in the center 4 as described above can be blended. The amount of the co-crosslinking agent to be blended is preferably 15 parts by weight or greater and 50 parts by weight or less per 100 parts by weight of the base rubber. When the amount to be blended is less than the above range, the resilience performance of the golf ball 1 may become insufficient. In this respect, the amount to be blended is more preferably equal to or greater than 20 parts by weight. When the amount to be blended is beyond the above range, the feel at impact of the golf ball 1 may become deteriorated. In this respect, the amount to be blended is more preferably equal to or less than 45 parts by weight, and particularly preferably equal to or less than 40 parts by weight.

The amount of the organic peroxide to be blended in the mid layer 5 is preferably 0.1 part by weight or greater and 6.0 parts by weight or less per 100 parts by weight of the base rubber. When the amount to be blended is less than the above range, the resilience performance of the golf ball 1 may become insufficient. In this respect, the amount to be blended is more preferably equal to or greater than 0.3 part by weight, and particularly preferably equal to or greater than 0.5 part by weight. When the amount to be blended is beyond the above range, the feel at impact of the golf ball 1 may become hard. In this respect, the amount to be blended is more preferably equal to or less than 5.0 parts by weight, and particularly preferably equal to or less than 4.0 parts by weight. Also in the mid layer 5, may be blended with a similar filler and various kinds of additives to those which may be blended in the center 4 as described above.

When the mid layer 5 is composed of a resin composition, examples of suitable base polymer include ionomer resins, thermoplastic polyester elastomers, thermoplastic polyamide elastomers, thermoplastic polyurethane elastomers, thermoplastic polyolefin elastomers and thermoplastic polystyrene elastomers. Two or more kinds of synthetic resins may be used in combination.

Of the ionomer resins, copolymers of $\alpha$-olefin and an $\alpha$, $\beta$-unsaturated carboxylic acid having 3 to 8 carbon atoms in which part of the carboxylic acid is neutralized with a metal ion are suitable. Examples of the preferable $\alpha$-olefin include ethylene and propylene. Examples of the preferable $\alpha$, $\beta$-unsaturated carboxylic acid include acrylic acid and methacrylic acid. Illustrative examples of the metal ion for use in the neutralization include sodium ion, potassium ion, lithium ion, zinc ion, calcium ion, magnesium ion, aluminum ion and neodymium ion. The neutralization may also be carried out with two or more kinds of the metal ions. In light of the resilience performance and durability of the golf ball 1, examples of the particularly suitable metal ion include sodium ion, zinc ion, lithium ion and magnesium ion.

The mid layer 5 may be blended with a filler for the purpose of adjusting specific gravity and the like. Examples of suitable filler include zinc oxide, barium sulfate, calcium carbonate and magnesium carbonate. Powder of highly dense metal may be blended as a filler. Specific examples of the highly dense metal include tungsten and molybdenum. The amount of the filler to be blended is determined ad libitum so that the intended specific gravity of the mid layer 5 can be accomplished. The mid layer 5 may be also blended with a coloring agent, crosslinked rubber powder or synthetic resin powder.

Thickness of the mid layer 5 is preferably 0.5 mm or greater and 4.0 mm or less. When the thickness is less than the above range, the resilience performance of the golf ball 1 may become insufficient. In this respect, the thickness is more preferably equal to or greater than 0.7 mm. When the thickness is beyond the above range, the feel at impact of the golf ball 1 may become insufficient. In this respect, the thickness is more preferably equal to or less than 3.0 mm, and particularly preferably equal to or less than 2.0 mm.

Shore D hardness Hm of the mid layer 5 is preferably equal to or greater than 55. The resilience performance of the golf ball 1 is thereby improved. In this respect, hardness Hm is more preferably equal to or greater than 58, and particularly preferably equal to or greater than 60. When hardness Hm is extremely high, the feel at impact of the golf ball 1 becomes insufficient. In this respect, hardness Hm is preferably equal to or less than 70, and more preferably equal to or less than 65.

Difference (Hm−Hc) between Shore D hardness Hm of the mid layer 5 and Shore D hardness Hc of the cover 3 is preferably equal to or greater than 5. The resilience performance of the golf ball 1 is thereby improved. In this respect, the difference of hardness (Hm−Hc) is more preferably equal to or greater than 8, and particularly preferably equal to or greater than 10. When the difference of hardness (Hm−Hc) is extremely large, the feel at impact of the golf ball 1 becomes insufficient. In this respect, difference of hardness (Hm−Hc) is preferably equal to or less than 40, more preferably equal to or less than 35, and particularly preferably equal to or less than 30. Shore D hardness of the cover 3 and the mid layer 5 is measured in accordance with a standard of "ASTM-D 2240-68", with a Shore D type spring hardness scale. When the subject (cover 3 or mid layer 5) to be measured consists of a resin composition, hardness is measured with a slab formed from this resin composition. When the subject to be measured consists of a crosslinked rubber composition, hardness is measured with a slab prepared by crosslinking of this rubber composition under an identical condition to the crosslinking condition of the subject to be measured.

The center 4 of the golf ball 1 depicted in FIG. 1 is composed of a single layer, however, a center composed of two or more layers may be also employed. Another mid layer may be provided between the center 4 and the mid layer 5, or another mid layer may be provided between the mid layer 5 and the cover 3. A core composed of a single layer without including a mid layer 5 may be also employed. In a golf ball 1 having two or more mid layers, it is preferred that in at least one mid layer, Shore D hardness Hm thereof is set to be greater than Shore D hardness Hc of the cover 3 by 5 or more; and Shore D hardness of that mid layer is preferably equal to or greater than 55.

EXAMPLES

Specifications of a center, a mid layer, a cover and dimples were defined as presented in Table 1 below, and golf balls of Examples 1 to 5 and Comparative Examples 1 to 5 were obtained. The diameter of these golf balls is 42.7 mm. Details of composition of the center and the mid layer are presented in Table 2; details of composition of the cover are presented in Table 3; and details of specifications of the dimples are presented in Table 4 and 5.

TABLE 2

Specification of Center and Mid layer

|  | (parts by weight) | | |
| --- | --- | --- | --- |
| Composition type | a | b | c |
| Polybutadiene *1 | 100 | 100 | — |
| Zinc acrylate | 27 | 36 | — |
| Zinc oxide | 5 | 5 | — |
| Bariumm sulfate *2 | appropriate amount | appropriate amount | — |
| Dicumyl peroxide | 0.8 | 0.8 | — |
| Ionomer resin 1605 *3 | — | — | 50 |
| Ionomer resin 1706 *4 | — | — | 50 |
| Crosslinking temperature (° C.) | 160 | 170 | — |
| Crosslinking time period (min) | 25 | 15 | — |

*1 JSR Corporation, trade name "BR11"
*2 adjusted to give the weight of the ball of 45.4 g
*3 Du Pont-MITSUI POLYCHEMICALS Co., LTD., trade name "Himilan 1605"
*4 Du Pont-MITSUI POLYCHEMICALS Co., LTD., trade name "Himilan 1706"

TABLE 3

Specification of Cover

|  | (parts by weight) | | | |
| --- | --- | --- | --- | --- |
| Composition type | W | X | Y | Z |
| Thermoplastic polyurethane elastomer *5 | 80 | — | — | — |
| Thermoplastic polyurethane elastomer *6 | — | 80 | — | — |
| Thermoplastic polyamide elastomer *7 | 20 | 20 | — | — |
| Ionomer resin 1557 *8 | — | — | 50 | — |
| Ionomer resin 1605 *3 | — | — | 50 | 50 |
| Ionomer resin AM7316 *9 | — | — | — | 50 |
| Titanium dioxide | 4 | 4 | 4 | 4 |

*5 BASF Polyurethane Elastomers Ltd., trade name "Elastolan XNY90A"
*6 BASF Polyurethane Elastomers Ltd., trade name "Elastolan XNY97A"
*7 ATOFINA Japan Co., Ltd., trade name "Pevax 5533"
*8 Du Pont-MITSUI POLYCHEMICALS Co., LTD., trade name "Himilan 1557"
*3 Du Pont-MITSUI POLYCHEMICALS Co., LTD., trade name "Himilan 1605"
*9 Du Pont-MITSUI POLYCHEMICALS Co., LTD., trade name "Himilan AM7316"

TABLE 1

Specification of Golf ball

|  |  | Example 1 | Example 2 | Example 3 | Example 4 | Example 5 | Com. Example 1 | Com. Example 2 | Com. Example 3 | Com. Example 4 | Com. Example 5 |
| --- | --- | --- | --- | --- | --- | --- | --- | --- | --- | --- | --- |
| Center | Composition type | a | a | a | a | a | a | a | a | a | a |
|  | Diameter (mm) | 37.5 | 37.5 | 36.1 | 37.5 | 37.5 | 37.5 | 37.5 | 37.5 | 37.5 | 37.5 |
| Mid layer | Composition type | c | c | b | c | c | c | c | c | c | c |
|  | Thickness (mm) | 1.3 | 1.3 | 2.0 | 1.3 | 1.3 | 1.3 | 1.3 | 1.3 | 1.3 | 1.3 |
| Cover | Composition type | W | X | X | W | W | Y | Z | W | W | W |
|  | Thickness (mm) | 1.3 | 1.3 | 1.3 | 1.3 | 1.3 | 1.3 | 1.3 | 1.3 | 1.3 | 1.3 |
| Dimple type |  | I | I | I | II | III | I | I | IV | V | VI |

TABLE 4

Specification of Dimples

Figure 5:
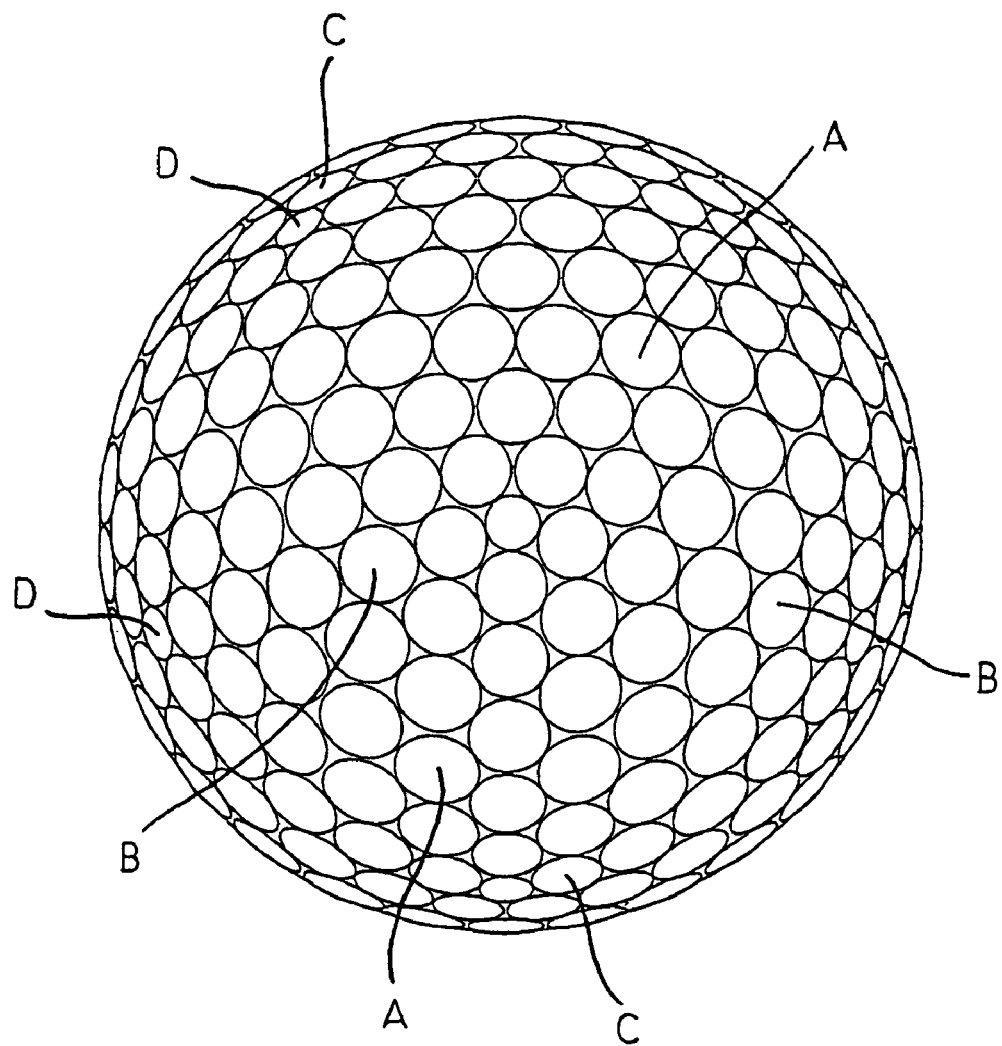
FIG. 5 is a plan view illustrating a golf ball according to Example 4 of the present invention.
Figure 6:
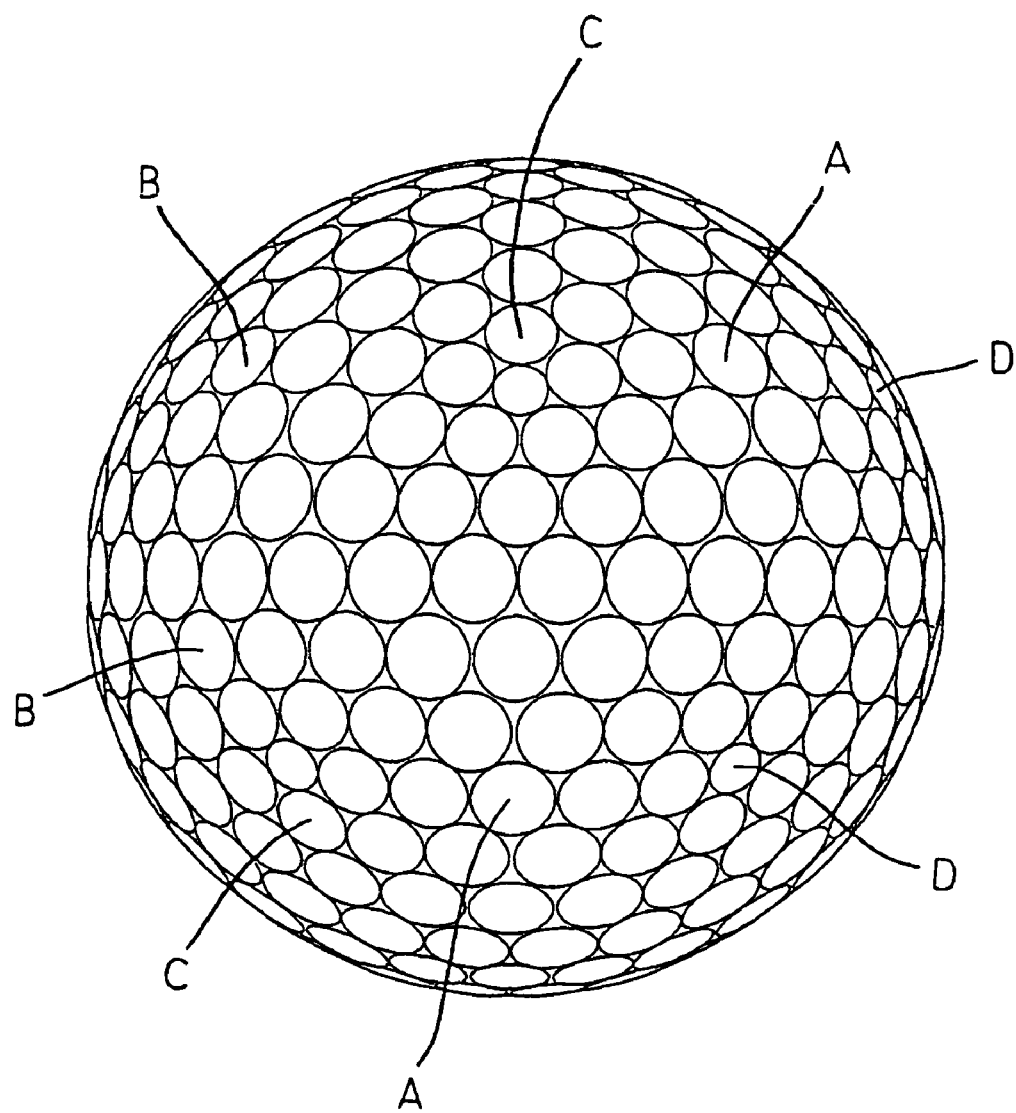
FIG. 6 is a front view illustrating the golf ball shown in FIG. 5.
Figure 7:
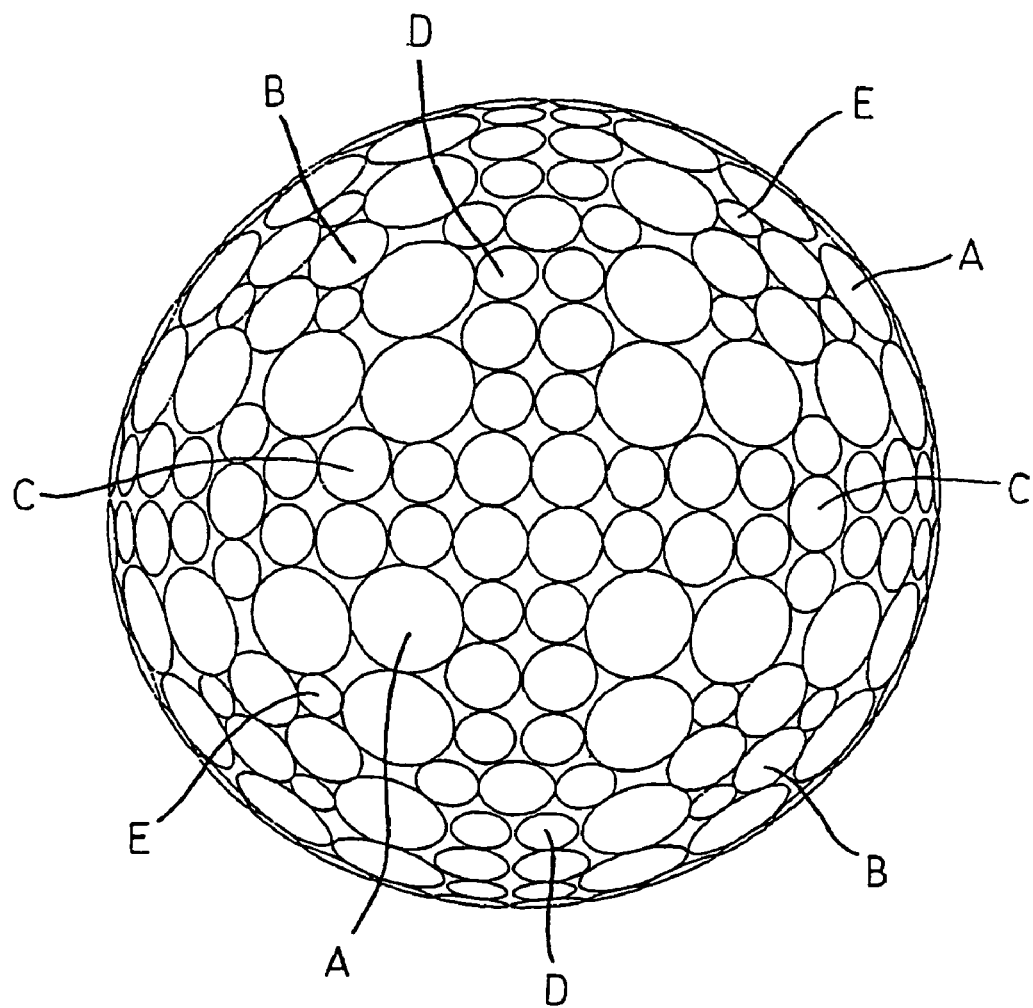
FIG. 7 is a plan view illustrating a golf ball according to Example 5 of the present invention.
Figure 8:
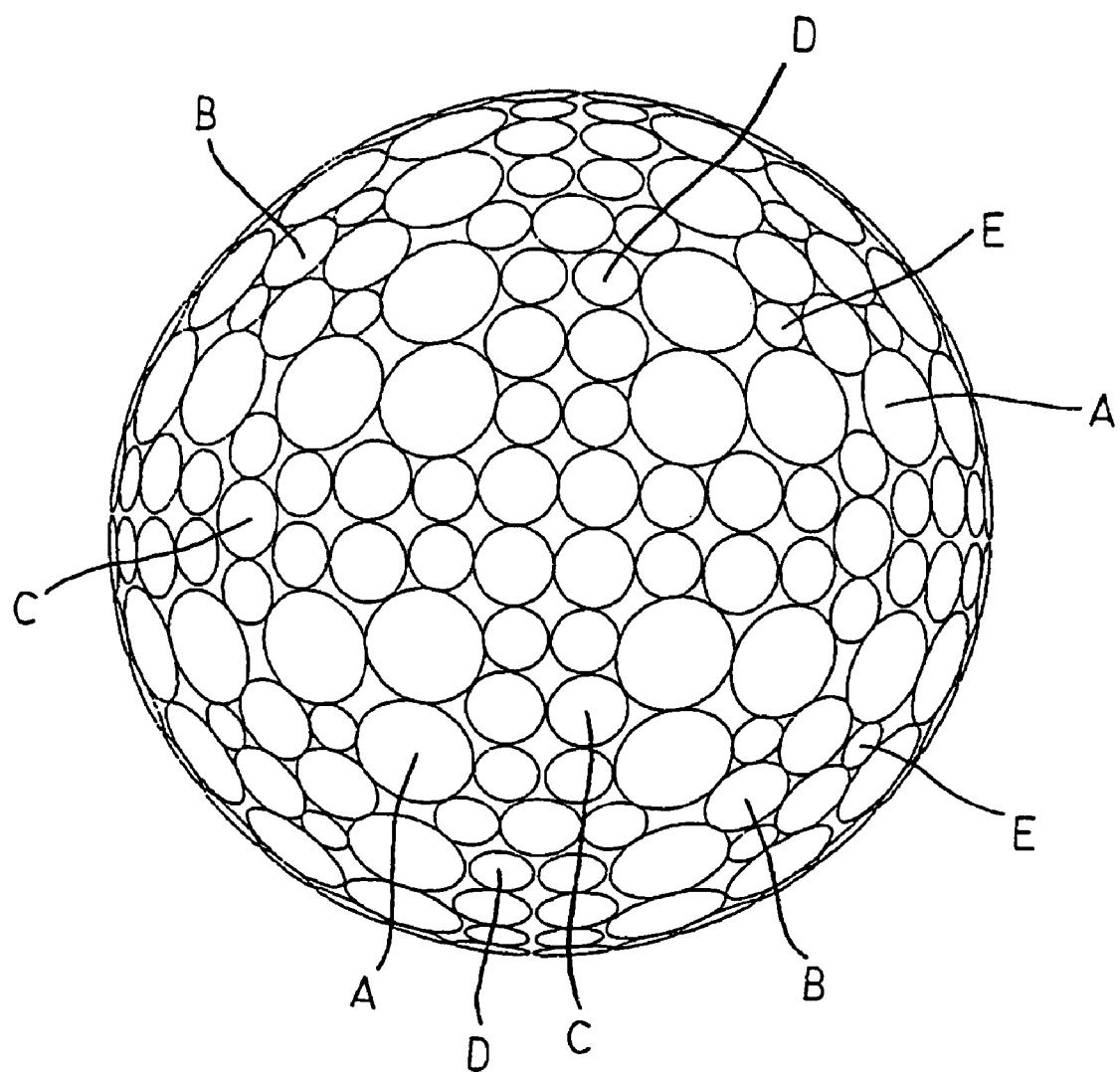
FIG. 8 is a front view illustrating the golf ball shown in FIG. 7.

| Type | Kind | Diameter d (mm) | Curvature r (mm) | Contour length x (mm) | Volume v (mm³) | Number | Number percentage (%) | Total number N | Average curvature R (mm) | Total contour length X (mm) | Total volume V (mm³) | Average volume Va (mm³) | Occupation ratio Y | Average occupation ratio y | Plan view Front view |
|---|---|---|---|---|---|---|---|---|---|---|---|---|---|---|---|
| I | A | 4.5 | 23.98 | 14.1 | 1.788 | 130 | 34.9 | 372 | 19.5 | 4701.1 | 500.0 | 1.344 | 0.840 | 0.00226 | FIG. 2 |
|  | B | 4.1 | 19.91 | 12.9 | 1.351 | 150 | 40.3 |  |  |  |  |  |  |  |  |
|  | C | 3.5 | 14.53 | 11.0 | 0.855 | 60 | 16.1 |  |  |  |  |  |  |  | FIG. 3 |
|  | D | 2.7 | 8.67 | 8.5 | 0.426 | 32 | 8.6 |  |  |  |  |  |  |  |  |
| II | A | 4.4 | 21.64 | 13.8 | 1.718 | 170 | 47.0 | 362 | 18.4 | 4585.5 | 500.1 | 1.382 | 0.818 | 0.00226 | FIG. 5 |
|  | B | 4.0 | 17.90 | 12.6 | 1.295 | 120 | 33.1 |  |  |  |  |  |  |  |  |
|  | C | 3.4 | 12.95 | 10.7 | 0.818 | 60 | 16.6 |  |  |  |  |  |  |  | FIG. 6 |
|  | D | 2.3 | 5.95 | 7.2 | 0.298 | 12 | 3.3 |  |  |  |  |  |  |  |  |
| III | A | 5.9 | 48.72 | 18.5 | 3.836 | 72 | 22.5 | 320 | 24.9 | 4194.7 | 500.0 | 1.562 | 0.808 | 0.00252 | FIG. 7 |
|  | B | 4.5 | 28.36 | 14.1 | 1.566 | 24 | 7.5 |  |  |  |  |  |  |  |  |
|  | C | 3.8 | 19.19 | 11.9 | 1.004 | 88 | 27.5 |  |  |  |  |  |  |  | FIG. 8 |
|  | D | 3.6 | 16.21 | 11.3 | 0.790 | 112 | 35.0 |  |  |  |  |  |  |  |  |
|  | E | 2.7 | 11.01 | 8.5 | 0.387 | 24 | 7.5 |  |  |  |  |  |  |  |  |

TABLE 5

Specification of Dimples

Figure 9:
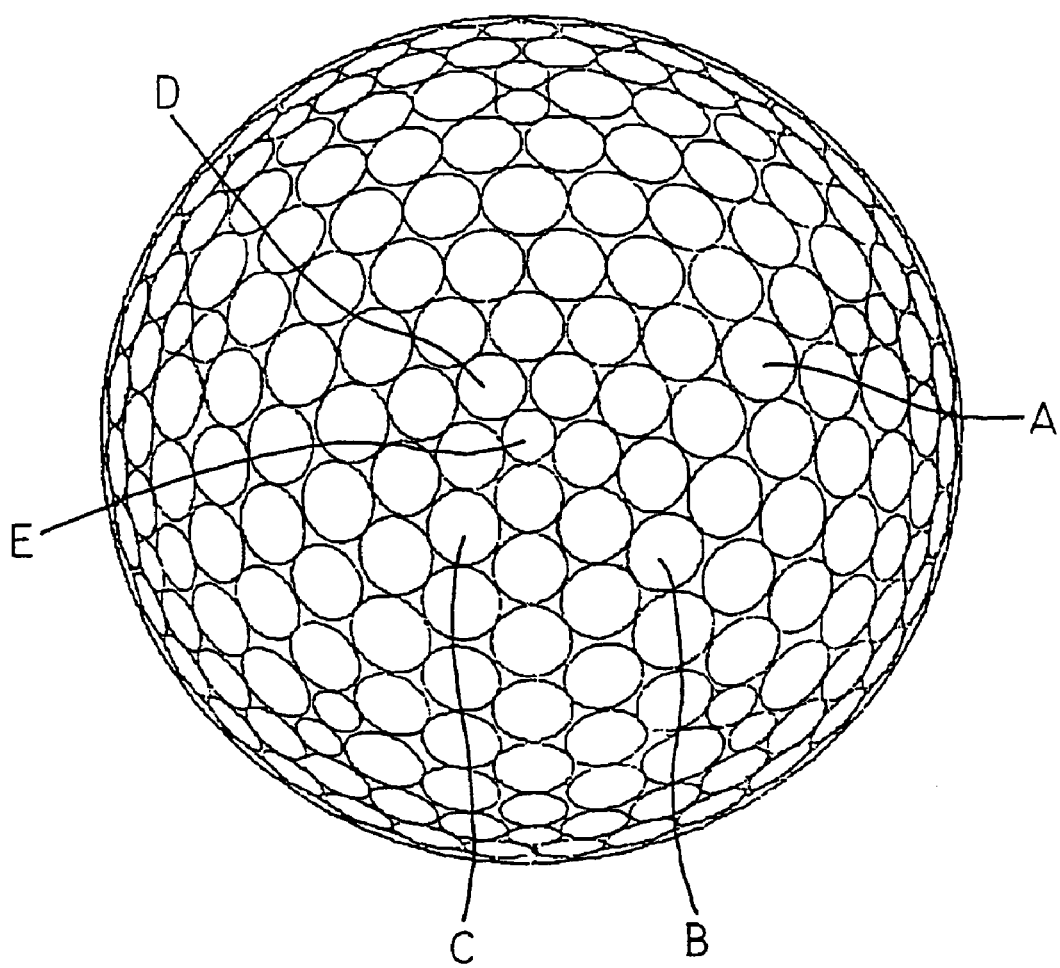
FIG. 9 is a plan view illustrating a golf ball according to Comparative Example 3 of the present invention.
Figure 10:
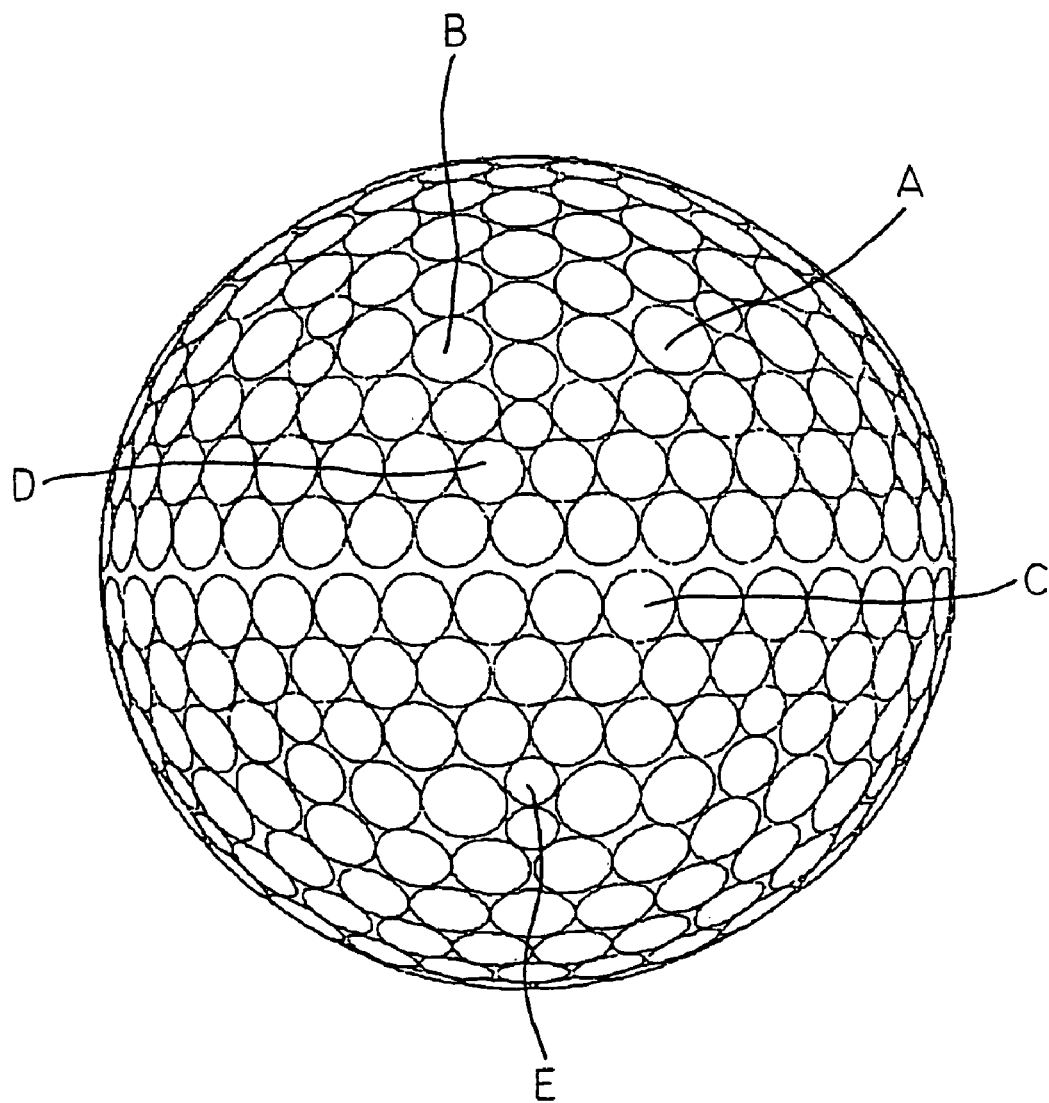
FIG. 10 is a front view illustrating the golf ball shown in FIG. 9.
Figure 11:
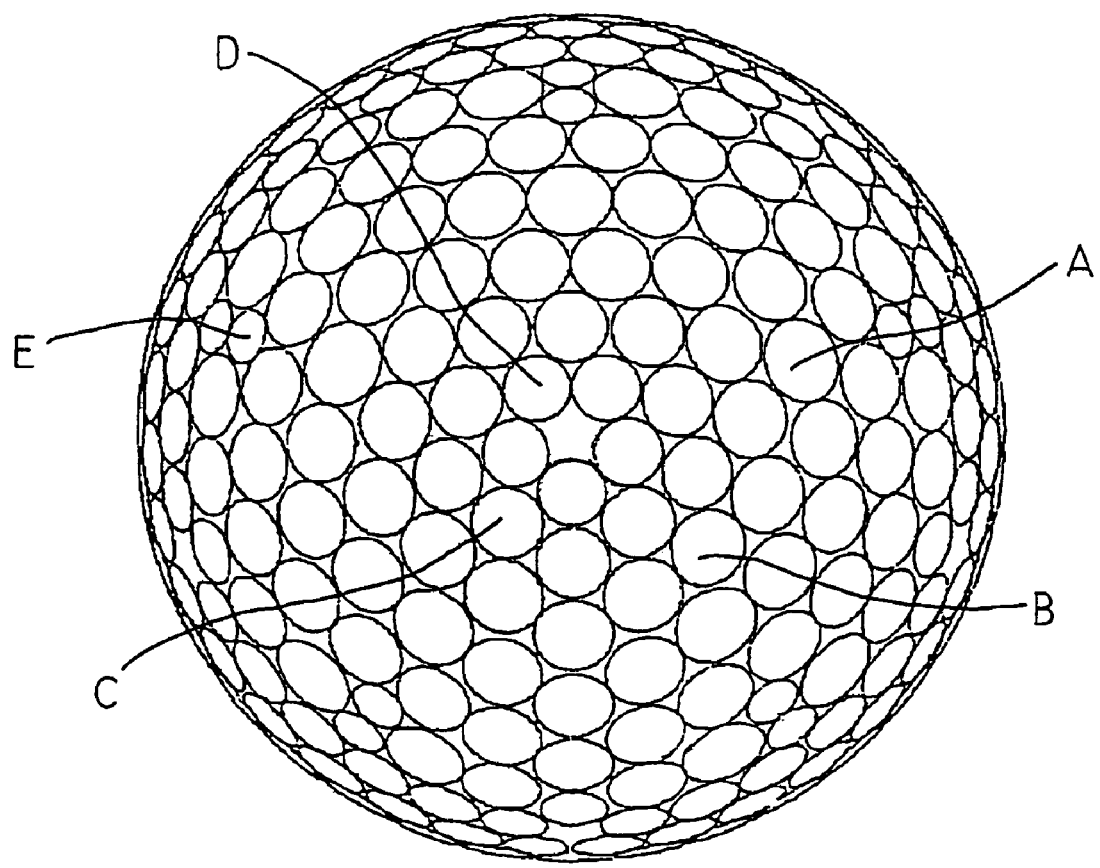
FIG. 11 is a plan view illustrating a golf ball according to Comparative Example 4 of the present invention.
Figure 12:
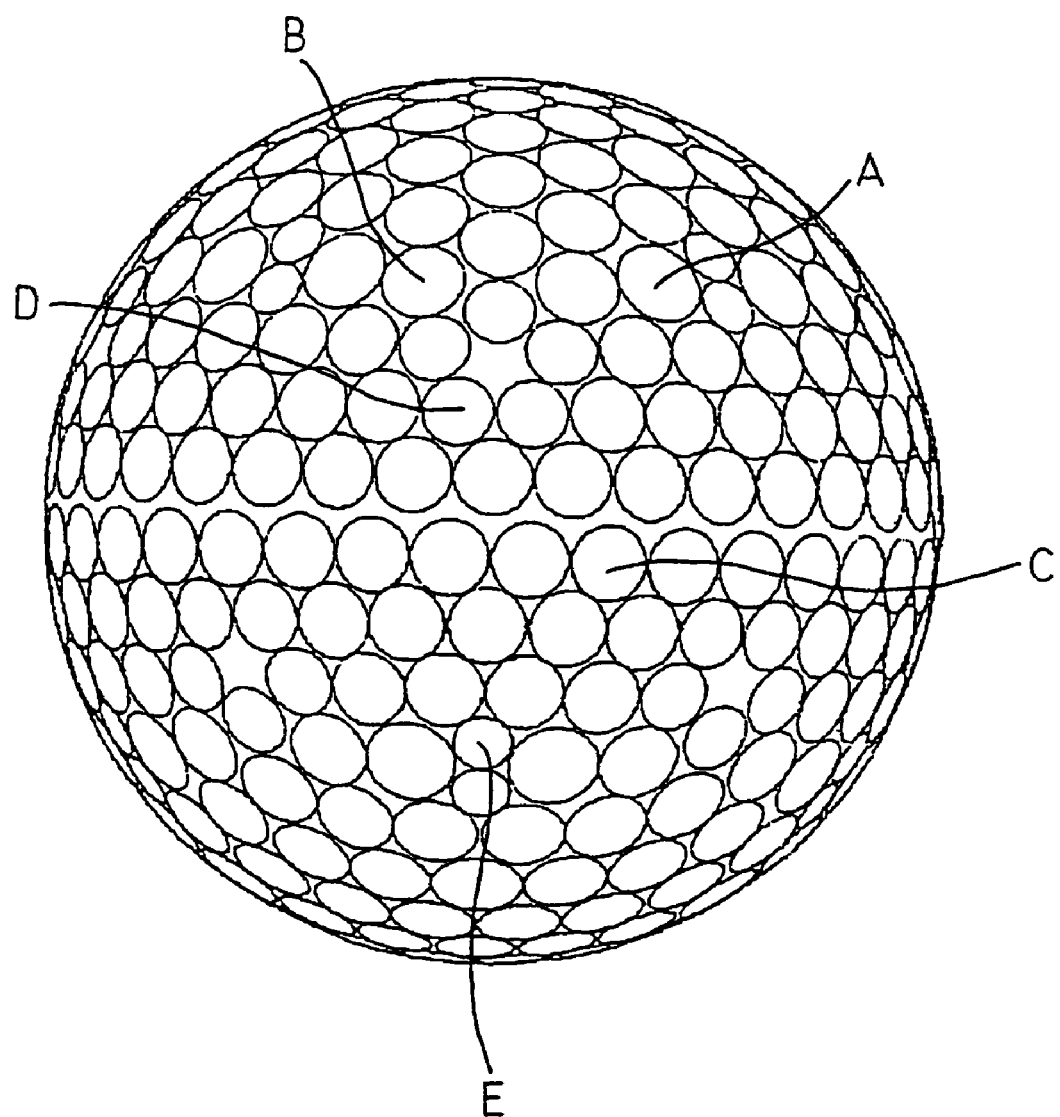
FIG. 12 is a front view illustrating the golf ball shown in FIG. 11.
Figure 13:
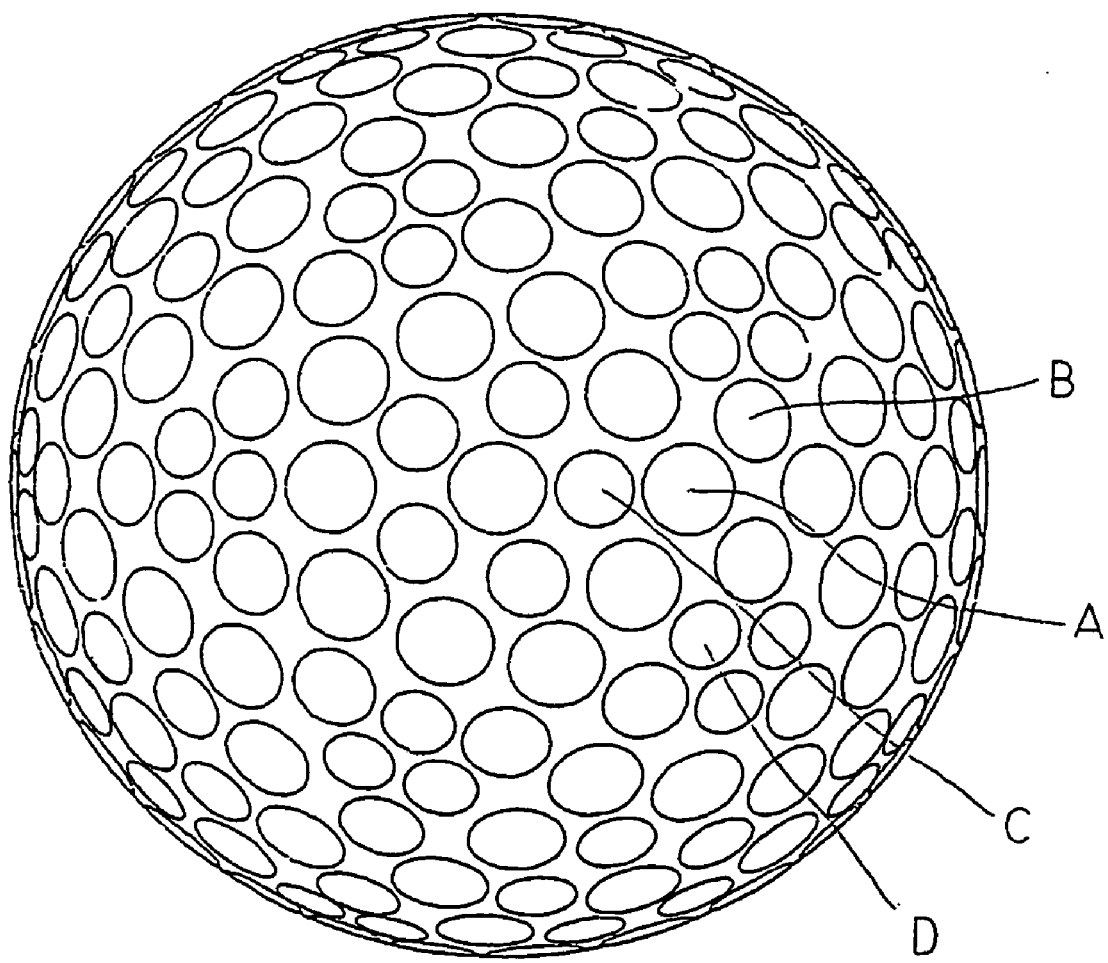
FIG. 13 is a plan view illustrating a golf ball according to Comparative Example 5 of the present invention.
Figure 14:
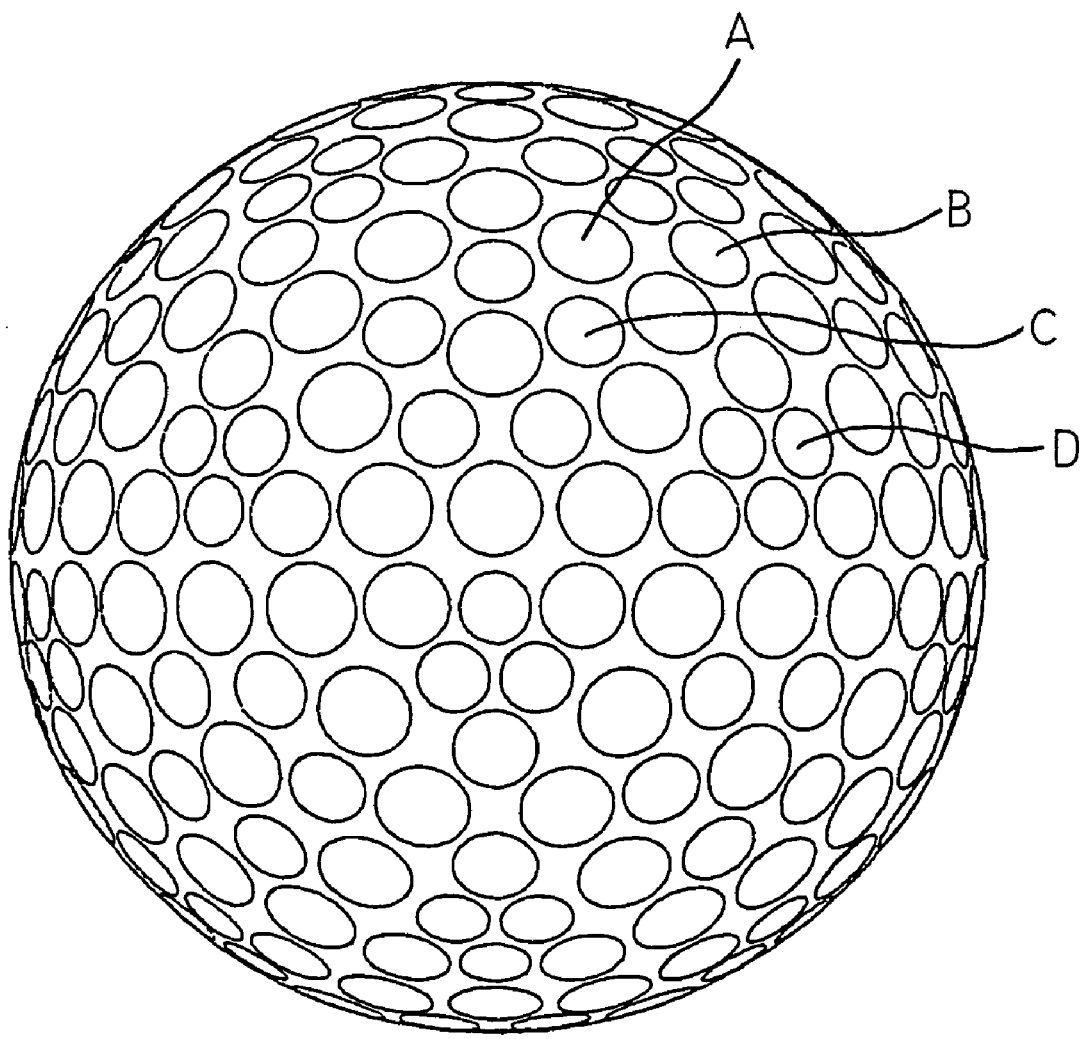
FIG. 14 is a front view illustrating the golf ball shown in FIG. 13.

| Type | Kind | Diameter d (mm) | Curvature r (mm) | Contour length x (mm) | Volume v (mm³) | Number | Number percentage (%) | Total number N | Average curvature R (mm) | Total contour length X (mm) | Total volume V (mm³) | Average volume Va (mm³) | Occupation ratio Y | Average occupation ratio y | Plan view Front view |
|---|---|---|---|---|---|---|---|---|---|---|---|---|---|---|---|
| IV | A | 4.3 | 18.45 | 13.5 | 1.702 | 30 | 6.9 | 432 | 14.0 | 5053.6 | 499.9 | 1.157 | 0.829 | 0.00192 | FIG. 9 |
|  | B | 4.0 | 15.97 | 12.6 | 1.381 | 130 | 30.1 |  |  |  |  |  |  |  |  |
|  | C | 3.7 | 13.68 | 11.6 | 1.109 | 180 | 41.7 |  |  |  |  |  |  |  | FIG. 10 |
|  | D | 3.4 | 11.56 | 10.7 | 0.880 | 60 | 13.9 |  |  |  |  |  |  |  |  |
|  | E | 2.8 | 7.86 | 8.8 | 0.530 | 32 | 7.4 |  |  |  |  |  |  |  |  |
| V | A | 4.3 | 18.06 | 13.5 | 1.722 | 30 | 7.1 | 420 | 13.9 | 4948.0 | 499.9 | 1.190 | 0.816 | 0.00194 | FIG. 11 |
|  | B | 4.0 | 15.64 | 12.6 | 1.398 | 130 | 31.0 |  |  |  |  |  |  |  |  |
|  | C | 3.7 | 13.39 | 11.6 | 1.123 | 180 | 42.9 |  |  |  |  |  |  |  | FIG. 12 |
|  | D | 3.4 | 11.32 | 10.7 | 0.892 | 60 | 14.3 |  |  |  |  |  |  |  |  |
|  | E | 2.8 | 7.70 | 8.8 | 0.538 | 20 | 4.8 |  |  |  |  |  |  |  |  |
| VI | A | 4.4 | 15.66 | 13.8 | 2.047 | 132 | 42.3 | 312 | 13.0 | 3898.1 | 500.0 | 1.603 | 0.686 | 0.00220 | FIG. 13 |
|  | B | 4.2 | 14.28 | 13.2 | 1.796 | 60 | 19.2 |  |  |  |  |  |  |  |  |
|  | C | 3.5 | 9.94 | 11.0 | 1.095 | 60 | 19.2 |  |  |  |  |  |  |  | FIG. 14 |
|  | D | 3.3 | 8.84 | 10.4 | 0.939 | 60 | 19.2 |  |  |  |  |  |  |  |  |

[Measurement of Amount of Compressive Deformation]

The golf ball was first placed on a hard plate made of metal. Next, a cylinder made of metal was rendered to descend gradually toward the golf ball, and thus the golf ball, which was intervened between the bottom face of this cylinder and the hard plate, was deformed. Then, a migration distance of the cylinder was measured, starting from the state in which an initial load of 98 N was applied to the golf ball up to the state in which a final load of 1274 N was applied thereto. The results thus obtained are shown in Table 6 below.

[Travel Distance Test]

A driver with a metal head was equipped with the swing machine of Golf Laboratory Co. Then the machine condition was set to give the head speed of 45 m/sec, and the golf ball was hit therewith. Travel distance (i.e., the distance from the launching point to the point where the ball stopped) was thus measured. Mean values of 5 times measurement are shown in Table 6 below.

[Scuff Resistance]

A pitching wedge was equipped with the swing machine described above. Then the machine condition was set to give the head speed of 36 m/sec, and the golf ball was hit therewith. The surface condition of the golf ball after hitting was visually observed, and was evaluated in accordance with the following criteria.

A: with small number of scuff marks although not remarkable

B: with scuff marks and fuzz

C: with parts scraped away and remarkable fuzz The results of evaluation are shown in Table 6 below.

[Evaluation of Control Performance]

Using a pitching wedge, the golf ball was hit by 10 high-class golf players. The control performance was evaluated accordingly. Those which were liable to be spun around and excellent in the control performance were assigned "A", those which were difficult to be spun around and inferior in the control performance were assigned "C", and those which were in an intermediate range between them were assigned "B". Results of evaluation which gave a maximum convergence are presented in Table 6 below.

TABLE 6

Results of Evaluation

|  | Example 1 | Example 2 | Example 3 | Example 4 | Example 5 |
| --- | --- | --- | --- | --- | --- |
| Principal component of cover* | U | U | U | U | U |
| Hardness of mid layer Hm | 64 | 64 | 61 | 64 | 64 |
| Hardness of cover Hc | 42 | 47 | 47 | 42 | 42 |
| Difference of hardness (Hm – Hc) | 22 | 17 | 14 | 22 | 22 |
| Average curvature R (mm) | 19.5 | 19.5 | 19.5 | 18.4 | 24.9 |
| Total contour length X (mm) | 4701.1 | 4701.1 | 4701.1 | 4585.5 | 4194.7 |
| Total volume V (mm$^3$) | 500.0 | 500.0 | 500.0 | 500.1 | 500.0 |
| Average volume Va (mm$^3$) | 1.344 | 1.344 | 1.344 | 1.382 | 1.562 |
| Surface area occupation ratio Y | 0.840 | 0.840 | 0.840 | 0.818 | 0.808 |
| Average occupation ratio y | 0.00226 | 0.00226 | 0.00226 | 0.00226 | 0.00252 |
| Total number of dimples N | 372 | 372 | 372 | 362 | 320 |
| Amount of compressive deformation (mm) | 2.7 | 2.6 | 2.7 | 2.7 | 2.7 |
| Travel distance (m) | 218.0 | 219.2 | 217.7 | 219.5 | 220.8 |
| Scuff resistance | A | A | A | A | A |
| Control performance | A | A | A | A | A |

|  | Comparative Example 1 | Comparative Example 2 | Comparative Example 3 | Comparative Example 4 | Comparative Example 5 |
| --- | --- | --- | --- | --- | --- |
| Principal component of cover* | I | I | U | U | U |
| Hardness of mid layer Hm | 61 | 64 | 64 | 64 | 64 |
| Hardness of cover Hc | 60 | 48 | 42 | 42 | 42 |
| Difference of hardness (Hm – Hc) | 1 | 16 | 22 | 22 | 22 |
| Average curvature R (mm) | 19.5 | 19.5 | 14.0 | 13.9 | 13.0 |
| Total contour length X (mm) | 4701.1 | 4701.1 | 5053.6 | 4948.0 | 3898.1 |
| Total volume V (mm$^3$) | 500.0 | 500.0 | 499.9 | 499.9 | 500.0 |
| Average volume Va (mm$^3$) | 1.344 | 1.344 | 1.157 | 1.190 | 1.603 |
| Surface area occupation ratio Y | 0.840 | 0.840 | 0.829 | 0.816 | 0.686 |
| Average occupation ratio y | 0.00226 | 0.00226 | 0.00192 | 0.00194 | 0.00220 |
| Total number of dimples N | 372 | 372 | 432 | 420 | 312 |
| Amount of compressive deformation (mm) | 2.6 | 2.6 | 2.7 | 2.7 | 2.7 |
| Travel distance (m) | 219.8 | 217.6 | 213.0 | 214.2 | 210.3 |
| Scuff resistance | B | C | A | A | A |
| Control performance | C | B | A | A | A |

*U: Thermoplastic polyurethane elastomer I: Ionomer resin

As is clear from Table 6, the golf ball of each of Examples is excellent in all terms of the flight performance, scuff resistance and control performance. Accordingly, advantages of the present invention are clearly indicated by these results of evaluation.

The description herein above is merely for illustrative examples, therefore, various modifications can be made without departing from the principles of the present invention.

What is claimed is:

1. A golf ball, which comprises a center, a mid layer, a cover and numerous dimples formed on the surface of the cover, wherein thickness of the mid layer is 0.5 mm or greater and 4.0 mm or less, Shore D hardness of the mid layer is 55 or greater and 70 or less, a base polymer of the cover includes a thermoplastic polyurethane elastomer as a principal component, Shore D hardness of the cover is 30 or greater and 55 or less, difference ($H_m$–$H_c$) between Shore D hardness $H_m$ of the mid layer and Shore D hardness $H_c$ of the cover is 5 or greater and 40 or less, surface area occupation ratio Y of the dimples is 0.80 or greater and 0.90 or less, total volume V of the dimples is 300 mm$^3$ or greater and 700 mm$^3$ or less, and average volume Va that is a value derived through dividing the total volume V by total number N of the dimples is equal to or greater than 1.30 mm$^3$.

2. The golf ball according to claim 1 wherein average curvature R that is a mean value of the curvature r of the cross-sectional shape of said dimples is equal to or greater than 16 mm.

3. The golf ball according to claim 1 wherein average occupation ratio y that is a value derived through dividing said surface area occupation ratio Y by total number N of the dimples is equal to or greater than 0.0022.

4. The golf ball according to claim 1 wherein a summation X of the contour length x of said dimples and the surface area occupation ratio Y satisfy the relationship represented by the following formula (I)

$$X \leq 3882 \ast Y + 1495 \qquad (I).$$

5. The golf ball according to claim 1 wherein percentage of number of dimples having the contour length x of equal to or greater than 10.5 mm accounts for equal to or greater than 91% of total number of the dimples.

6. The golf ball according to claim 1 wherein the base polymer of said cover includes a thermoplastic polyamide elastomer.

7. A golf ball, which comprises a center, a mid layer, a cover and numerous dimples formed on the surface of the cover, wherein thickness of the mid layer is 0.5 mm or greater and 4.0 mm or less, Shore D hardness of the mid layer is 55 or greater and 70 or less, a base polymer of the cover includes a thermoplastic polyurethane elastomer and a thermoplastic polyamide elastomer as a principal component, weight ratio of both components is 70/30 or greater and 95/5 or less, Shore D hardness of the cover is 30 or greater and 55 or less, difference ($H_m - H_c$) between Shore D hardness $H_m$ of the mid layer and Shore D hardness $H_c$ of the cover is 5 or greater and 40 or less, surface area occupation ratio Y of the dimples is 0.80 or greater and 0.90 or less, total volume of V of the dimples is 300 mm$^3$ or greater and 700 mm$^3$ or less, and average volume Va that is a value derived through dividing the total volume V by total number N of the dimples is equal to or greater than 1.30 mm$^3$.

8. The golf ball according to claim 7 wherein average curvature R that is a mean value of the curvature r of the cross-sectional shape of said dimples is equal to or greater than 16 mm.

9. The golf ball according to claim 7 wherein average occupation ratio y that is a value derived through dividing said surface area occupation ratio Y by total number N of the dimples is equal to or greater than 0.0022.

10. The golf ball according to claim 7 wherein a summation X of the contour length x of said dimples and the surface area occupation ratio Y satisfy the relationship represented by the following formula (I)

$$X \leq 3882*Y+1495 \tag{I}.$$

11. The golf ball according to claim 7 wherein percentage of number of dimples having the contour length x of equal to or greater than 10.5 mm accounts for equal to or greater than 91% of total number of the dimples.

* * * * *